United States Patent [19]

Monette

[11] 4,386,290
[45] May 31, 1983

[54] CENTRIFUGAL ACTUATOR FOR A.C. INDUCTION MOTOR

[75] Inventor: Gerald J. Monette, Wausau, Wis.

[73] Assignee: Marathon Electric Manufacturing Corp., Wausau, Wis.

[21] Appl. No.: 259,024

[22] Filed: Apr. 30, 1981

[51] Int. Cl.³ .................................................. H02K 11/00
[52] U.S. Cl. .................................. 310/68 E; 200/80 R
[58] Field of Search .................... 310/68 E; 200/80 R

[56] References Cited

U.S. PATENT DOCUMENTS

| 2,747,854 | 5/1956 | Schnepf | 200/80 R X |
| 3,691,415 | 9/1972 | Hancock et al. | 310/68 E |
| 4,205,245 | 5/1980 | Hildebrandt et al. | 310/68 E |
| 4,242,607 | 12/1980 | Hildebrandt et al. | 310/68 E |
| 4,289,988 | 9/1981 | Schaefer | 310/68 E |
| 4,334,161 | 6/1982 | Carli | 310/68 E |
| 4,336,472 | 6/1982 | Czech | 310/68 E |

*Primary Examiner*—Donovan F. Duggan
*Attorney, Agent, or Firm*—Andrus, Sceales, Starke & Sawall

[57] ABSTRACT

A centrifugal actuator for activating a stationary switch in a single phase induction motor which has a hub with a central opening inside a central body portion for assembly and securement on the shaft of a motor for rotation thereby. The hub has a flat outer member for contacting the switch to actuate starting windings of the motor when the motor is in a rest condition and is removed from the switch under centrifugal action by weights located inside the actuator to cut out the starting windings when the motor is in a run condition.

4 Claims, 5 Drawing Figures

CENTRIFUGAL ACTUATOR FOR A.C. INDUCTION MOTOR

BACKGROUND OF THE INVENTION

Some single phase induction motors depend on the use of a start winding which is located ninety electrical degrees from the run winding in order to develop sufficient torque to accelerate the motor up to running speed. The start winding is ordinarily designed for short term use which necessitates that the winding be removed from the circuit when the motor comes up to speed. This is usually accomplished by installing a stationary switch and a centrifugal actuator. The actuator to which this application is directed employs the use of hinges which enables the weights to move from a start position to a run position by a pivoting action rather than a sliding action along the base. The actuator of the invention utilizes a base of magnetic material to enclose the weights on a minimum of three sides of an envelope around the weights which diverts magnetic flux from the motor away from the weights and this minimizes the effect of magnetic flux on switching speed. The actuator of the invention also has preloaded tabs which are an integral part of the base and preloaded recesses which are an integral part of the hub and these are designed in a manner so that the preloaded recesses and tabs develop sufficient force on the hub to prevent the hub from rattling on the shaft as the motor coasts down and the hub contacts the stationary switch. The preloading of the tabs and recesses is provided by a pair of springs which extend diametrically on each side of the actuator.

SUMMARY OF THE INVENTION

The centrifugal actuator of the invention has a hub secured over a rotatable shaft of the motor and in a rest position holds a stationary switch of an electric motor in the start position until the motor accelerates to a predetermined speed. Centrifugal force then acts on weights in the actuator to pivot them outwardly and the forces developed overcome the forces of springs holding the actuator in the start position and the stationary switch is then free to open and be placed in a run position as the hub of the actuator is moved out of contact with the wear pad of the switch which has kept the contacts closed. This action deenergizes the circuit of the start winding.

In the construction of the invention the weights and the hinges connected to the weights are protected from the passage of magnetic flux to them from the windings of the motor by an envelope which consists of a base and side members which are assembled over the body of the hub adjacent the motor and side members and base combine to completely enclose and shield the weights and hinges from the magnetic flux developed by the start windings of the motor. When the centrifugal actuator moves from a start position to a run position the envelope developed by the centrifugal actuator does not increase. Weights are connected by hinges to the side members and the weights pivot around knife edges on the lower end of abutments located on the body of the hub so that the weights are always completely out of contact with the base which faces the motor and this prevents wear on the base and weights and overcomes any problem of burrs which may be present on the surface of the base over which the weights slide under the usual construction.

In order to prevent rattle on coastdown, preloaded tabs on the side members are lodged in preloaded recesses in the body of the hub and the preloading has first to be overcome before rattle of the hub on the motor shaft can occur.

DETAILED DESCRIPTION OF THE INVENTION

Figure 1:
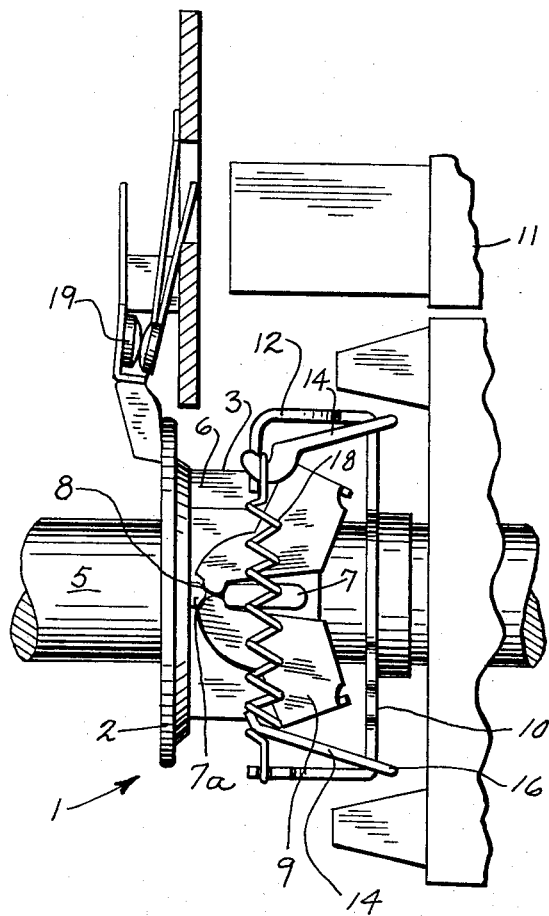
FIG. 1 is a longitudinal side view illustrating the centrifugal actuator in the rest position.
Figure 2:
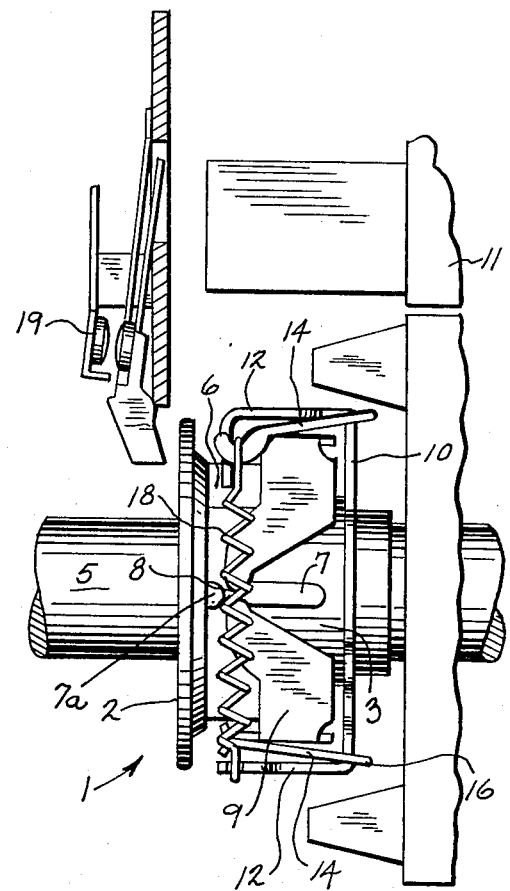
FIG. 2 is a view similar to FIG. 1 with the centrifugal actuator in a run position.
Figure 4:
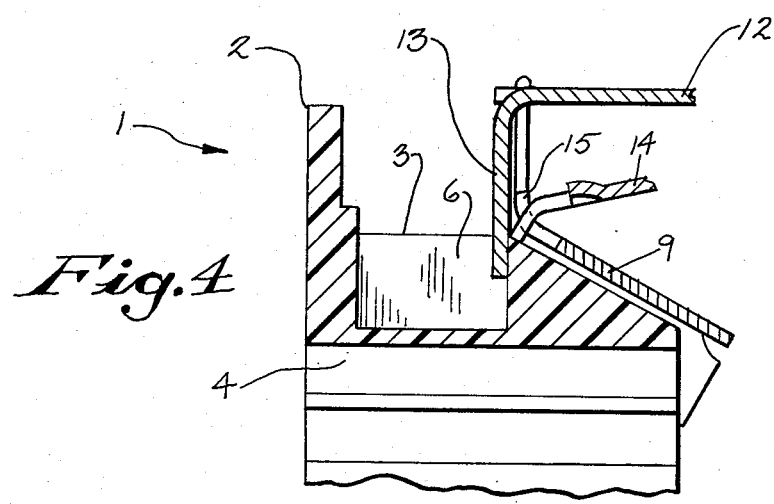
FIG. 4 is a detailed view illustrating a preload tab disposed in a recess in the hub on one of the knife edges around which the weights pivot.
Figure 3:
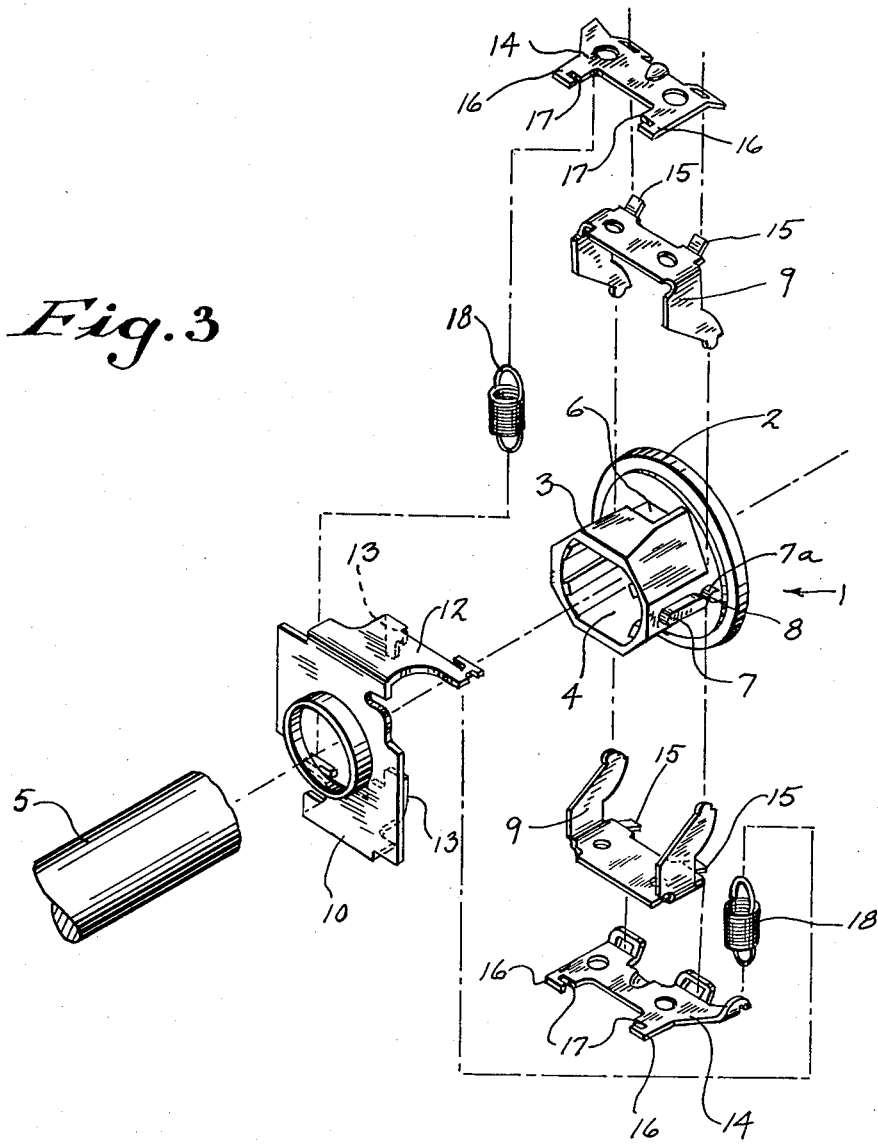
FIG. 3 is an exploded view illustrating the various parts of the centrifugal actuator.
Figure 5:
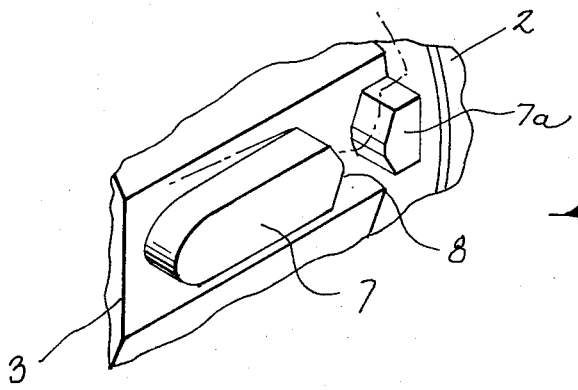
FIG. 5 is a detailed view illustrating one of the knife edges around which the weights pivot.

Referring to the drawings, there is illustrated a hub 1 which has flat top or switch means 2 overlying the body 3 of hub 1 with a central opening 4 therethrough for assemblying and securing hub 1 over the motor shaft 5 to which hub 1 is secured. The body 3 of hub 1 has the oppositely disposed preloaded recesses 6 and the oppositely disposed abutments 7 with the lower edge of each abutment 7 having a knife edge 8 around which the lower end of the weights 9 pivot when actuated. A second smaller abutment 7a acts to hold the weights against the abutment 7 as weights 9 pivot therearound.

The inner end of the actuator is closed by a base 10 which has a central opening for assembly over body 3 of hub 1 and base 10 faces motor 11 and has side members 12 connected thereto which with the base provides a magnetic protective envelope around the internal parts of the actuator. The recesses 6 provided on opposite sides of the body 3 of hub 1 receive the preloaded tabs 13 which project inwardly of the respective side members 12 of base 10. The preloaded tabs 13 develop a force on the hub preloaded recesses 6 before hub 1 will rattle on the motor shaft 5 during coastdown. Because tabs 13 are disposed as part of base 10 and the preloaded recesses 6 are an integral part of hub 1 no additional components are necessary to prevent rattle during coastdown.

The internal weights 9 which actuate switch means 2 of hub 1 under centrifugal action are connected to hinges 14 by projections 15 which extend through slots in hinges 14. The hinges in turn are also connected to side members 12 by ears 16 which are lodged in slots 17 in side members 12. A pair of springs 18 are hooked at one end to the weights 9 and extend diametrically on opposite sides of the hub and are hooked at the opposite end to a side member 12. The springs 18 operate to displace the actuator to a rest position when rotation of the actuator ceases and also to preload recesses 6 and tabs 13.

Base 10 facing the motor 11 and the side members 12, both of which are of magnetic material, encloses weights 9 and hinges 14 and provides an envelope to completely shield these parts from magnetic flux developed by the windings, not shown, of the motor 11 and the envelope at the start of the motor which is the most critical time takes the largest position when the flux problem is the greatest.

The actuator of the invention has a number of improvements over present centrifugal actuators in use and has a construction which protects the life of the start windings of the motor.

The preload construction also eliminates an obnoxious rattle between the motor shaft and hub of the actuator upon coastdown.

By locating the weights so that they do not engage the base of the actuator, burrs on the base are immaterial if they happen to exist and wear between the weights and the base is eliminated because the weights are actuated in a location removed from the base.

The switch means 2 is operated by the actuator to engage the switch 19 and to energize the start windings, not shown, of motor 11.

Various modes of carrying out the invention are contemplated as being within the scope of the following claims particularly pointing out and distinctly claiming the subject matter which is regarded as the invention.

I claim:

1. A centrifugal actuator comprising a hub having switch actuating means at one end of the hub for engaging a switch having contacts movable between a first circuit position and a second circuit position, said hub having a body portion connected to the hub and extending from the switch actuating means and disposed to be assembled on a shaft of an electric motor for rotation by the shaft, a base member of magnetic material assembled over the body portion opposite the switch means and comprising an elongated base located adjacent to the motor and side members connected to the base which combine with the base to block the flow of magnetic flux from the windings of the motor to the internal parts of the centrifugal actuator, a plurality of oppositely disposed weights pivoted together around the hub body portion and pivoting to a position under centrifugal force to move the body portion and the hub and thereby to move the contacts of the switch from said first circuit position to said second circuit position, and springs secured at one end of the side members and at the other end to the weights and extending diametrically over the body of the hub and on opposite sides thereof to return the actuator to a rest position when the motor shaft is no longer rotating to pivot the weights outwardly by centrifugal action and return the contacts from the second circuit position to the first circuit position.

2. The centrifugal actuator of claim 1 having hinges connecting the weights to the side members, the body portion of the hub having oppositely disposed abutments which have a knife edge at the abutting end, and the weights under centrifugal actuation rotating at their one ends around the knife edges of the abutments to move the weights inwardly or outwardly under centrifugal force, and the movement of the weights moving the hub inwardly or outwardly on the motor shaft to collapsed or expanded position.

3. The centrifugal actuator of claim 1 or 2, and preloaded tabs extending from the bottom of each side member and a complementary recess in the opposite sides in the body of the hub which receives and confines each tab, the preload of the tabs being provided by the springs which requires substantial exerted force between the hub recesses and the tabs which must be overcome before the hub will rattle on the shaft during coastdown.

4. The centrifugal actuator of claim 1 or 2 wherein said switch contacts are closed in said first position and open in said second position.

* * * * *